United States Patent [19]

Nagumo

[11] Patent Number: 4,710,923
[45] Date of Patent: Dec. 1, 1987

[54] CONTROL SYSTEM FOR DEINTERLEAVING MEMORIES IN DIGITAL AUDIO REPRODUCING APPARATUS

[75] Inventor: Masahide Nagumo, Kawasaki, Japan

[73] Assignee: Kabushiki Kaisha Toshiba, Kawasaki, Japan

[21] Appl. No.: 792,890

[22] Filed: Oct. 30, 1985

[30] Foreign Application Priority Data

Oct. 31, 1984 [JP] Japan ................................ 59-229234

[51] Int. Cl.$^4$ ............................................. G06F 11/10
[52] U.S. Cl. ............................................. 371/2; 371/39
[58] Field of Search ........................... 371/2, 38, 39, 40

[56] References Cited

U.S. PATENT DOCUMENTS

| | | | |
|---|---|---|---|
| 4,206,440 | 6/1980 | Doi et al. | 371/39 |
| 4,394,642 | 7/1983 | Currie et al. | 371/40 X |
| 4,541,091 | 9/1985 | Nishida et al. | 371/39 |
| 4,546,474 | 10/1985 | Sako et al. | 371/39 |
| 4,593,394 | 6/1986 | Tomimitsu | 371/39 |
| 4,598,403 | 7/1986 | Odaka | 371/39 |

Primary Examiner—Charles E. Atkinson
Attorney, Agent, or Firm—Oblon, Fisher, Spivak, McClelland & Maier

[57] ABSTRACT

A control system for deinterleaving memories in a digital audio reproducing apparatus. A plurality of cross-interleaved symbols are written into or read out from the memory areas of a RAM. The control system includes three processors for controlling the symbols. The first processor prepares a memory area with a predetermined storage capacity in the RAM. The second processor reads and writes the first symbol of a plurality of cross-interleave symbols into the memory area. The third processor likewise reads and writes the second symbol into the memory area. The second processor includes a counter for determining the address. The third processor includes an adder producing a sum of the counter output and a fixed amount to determine the second address.

13 Claims, 13 Drawing Figures

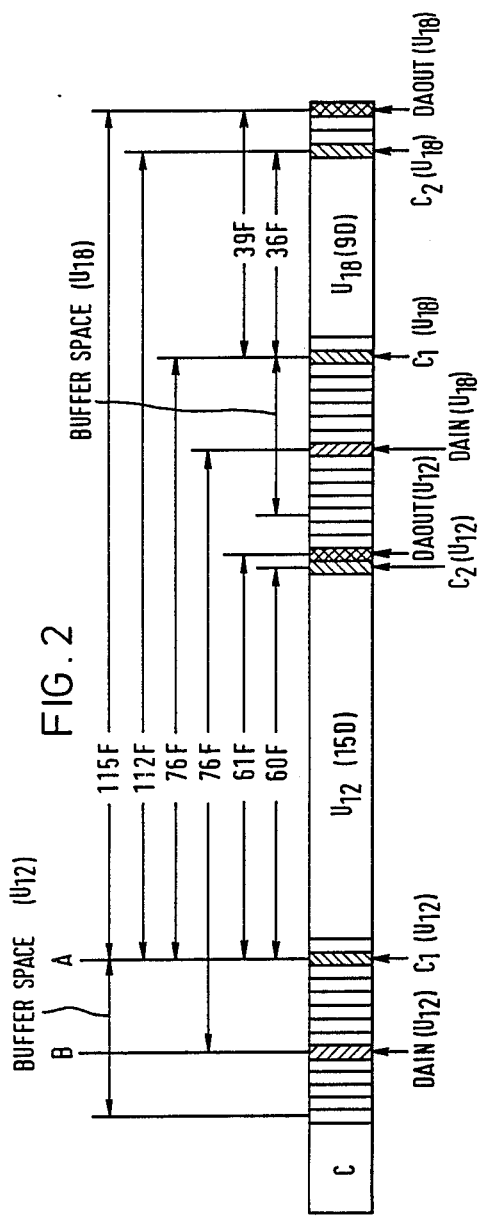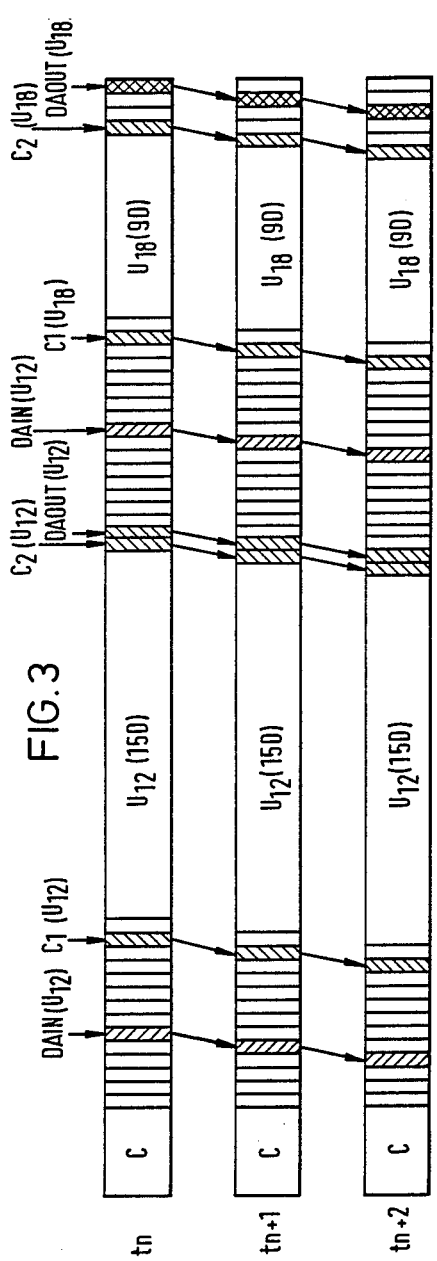

FIG. 10
PRIOR ART $r = CN5 + 4 \pmod 5$

| CN5 | w | r |
|---|---|---|
| 4 | 4 | 3 |
| 3 | 3 | 2 |
| 2 | 2 | 1 |
| 1 | 1 | 0 |
| 0 | 0 | 4 |
| 4 | 4 | 3 |
| 3 | 3 | 2 |
| 2 | 2 | 1 |

CONTROL SYSTEM FOR DEINTERLEAVING MEMORIES IN DIGITAL AUDIO REPRODUCING APPARATUS

BACKGROUND OF THE INVENTION

1. Field of the Invention

The present invention relates generally to a digital audio reproducing apparatus, and more particularly to a control system for deinterleaving memories in digital audio reproducing apparatus.

2. Description of the Prior Art

As is well known in the field of audio equipment, digital recording and reproducing systems utilizing a pulse code modulation (hereinafter simply refered to PCM) techniques have been used for recording and reproducing with high density and high fidelity. The digital recording and reproducing system for audio equipment is referred to as digital audio systems. In the digital audio system, the recording medium used for digitized data which are digitally coded from the analogue information signal are conventional magnetic tapes and discs. Since its many audio characteristics, however, are independent of the quality of the recording medium, the digital audio system is evaluated as being remarkably superior to those of conventional analogue recording and reproducing systems.

An optical compact disc (hereinafter simply refered to as CD), for example, is known as a recording medium on which the audio signal is recorded by PCM. In the recording of PCM data on the CD, an EFM (Eight to Fourteen Modulation) technique is further utilized for the benefit of reproducing the CD so as to extract bit synchronizing signals easily from the recorded PCM data and accurately perform a data slice on a reproduced signal from the CD, which is generally an RF signal since it has a radio frequency, by narrowing a frequency band of the recorded PCM data. The EFM is a technique where the digitized data are divided every eight bits and then modulated in a fourteen bit word data for easily reproducing the CD. Twenty four data words make a frame consisting of five hundred and eighty eight bits together with four P-parity check words P, four Q-parity check words Q, frame synchronizing data bits, control data bits and margin bits. It has been previously proposed to use a so-called cross-interleave technique in a data transmission system that is effective in correcting burst errors. According to this cross-interleave technique, P-parity check words P are provided for error correction to the data words contained in an original arrangement state in the frame, while Q-parity check words Q are provided for error correction to twenty eight data words (except Q-parity check words Q) contained in an arrangement state converted through the cross-interleave technique in a predetermined order.

In the reproducing process, an RF signal or a signal picked up from the CD as a round sinusoidal waveform signal is shaped into a rectangular waveform signal, and then carries out an EFM demodulation, deinterleaving, an error correction and D/A (digital to analogue) conversion in order.

FIG. 8 shows a block diagram of an example of the reproducing section of the digital audio system. In the drawing, a reproduced signal from a CD is supplied to a EFM demodulator 12 through an input terminal 11 after it is shaped into the rectangular waveform and then demodulated to the original eight bits PCM data word from the fourteen bits EFM modulated words therein. The data words are stored into a read/write memory or a random access memory (RAM) 13. A write processing (DAIN) of the data words to RAM 13 is controlled by a clock signal extracted from phase components of the reproduced signal so that the data words written into RAM 13 are affected with jitter according to the irregularities of the disc rotating system. RAM 13 is provided with buffer memory areas necessary for absorbing the jitter.

The data words stored in RAM 13 are read out and supplied into a first error correction processor (refered simply as C1 processor hereinafter) 14 in the order of thirty two words (referred as symbols hereinafter) U0 to U31 which are converted by the cross-interleave technique and then checked for errors on the symbols. C1 processor 14 corrects some error symbols Ui' in the symbols to correct symbols Ui by using P-parity check words P and then writes again the correct symbol Ui into RAM 13 in place of error symbol Ui'. C1 processor 14 has an ability for correcting two error symbols.

The symbols processed by C1 processor 14 are again read out from RAM 13 and supplied into a second error correction processor (refered simply as C2 processor hereinafter) 15 in the order of twenty eight symbols U0 to U27 except Q-parity check word symbols and then checked for errors on the symbols. C1 processor 15 corrects some error symbols Uj' in symbols U0 to U27 to correct symbols Uj by using Q-parity check words Q and then writes again correct symbols Uj into RAM 13 in place of error symbols Uj'. C2 processor 15 has an ability for correcting three error symbols.

After the error corrections at C1 processor 14 and C2 processor 15, correct data symbols stored in RAM 13 are read out again and supplied into an error compensation circuit 16 wherein the data symbols are further processed by a known error compensation technique for any error symbols left uncorrected by C1 processor 14 and C2 processor 15. The word symbols compensated at error compensation circuit 16 are applied to a D/A converter (not shown) through an output terminal 17 connected to error compensation circuit 16.

The deinterleaving is performed by reading symbols U0–U27 out from RAM 13 with a predetermined delay amount. Symbols U0–U27 are prescribed to have individually the amount of delay 27D, 26D, . . . and 0D, where D equals four times a frame F, i.e., D=4F and one frame F includes thirty two symbols U0–U27. RAM 13 is therefore provided with memory areas capable of storing the longest delay amount 27D.

Now, an example of RAM 13 will be explained, where seven symbols U0–U6 are adopted and the respective delay amounts are assumed as 6F, 5F, . . . and 0F. In this example, RAM 13 has its memory area allocated as shown in FIG. 9. Row H and column V in the drawing respectively mean lower and upper addresses of RAM 13. Write and read operations of a symbol, e.g., symbol U2 are repeatedly made as shown in FIG. 10, wherein letters r and w represents respectively a read address and a write address of symbol U2. Since symbol U2 is assigned from "0" to "4" of lower address H as to its write area, a scale-of-5 downcounter (not shown) is used for an address generator. Count values "0" to "4" of the scale-of-5 downcounter are used as write addresses w as they are, and values given by modulo-5 addition to the count values, i.e., write addresses w. Practically, a scale-of-8 downcounter which is massmanufactured commercially and easily available is used in place of the scale-of-5 downcounter. In FIG. 10, CN5 represents the count values of the scale-of-5 downcounter (actually a part of the scale-of-8 downcounter), and mod5 means the modulo-5 operation.

Therefore, a circuit diagram as shown in FIG. 11 has been conceived for generating write addresses w and read addresses r for all of symbols U0 to U6 for the example shown in FIG. 9. In FIG. 11, there are provided a group of downcounters 18 and a ROM (Read Only Memory) 19. Downcounter group 18 and ROM 19 are coupled respectively to first and second selectors 21, 30 which are connected to an input terminal 20. The downcounters of scale-of-7 to scale-of-1 respectively generate lower addresses H for writing respective symbols U0 to U6 into RAM 13, while ROM 19 supplies delay amount data of 6F or 0F corresponding to respective symbols U0 to U6.

Input terminal 20 receives data respectively indicating symbols U0 to U6, a read request signal (referred as read signal hereinafter) and a write request signal (referred as write signal hereinafter). Symbols U0 to U6 are applied from EFM demodulator 12, C1 processor 14 and C2 processor 15 in accordance with any stage in the course of the deinterleaving process (see FIG. 8). The read signal and the write signal are applied from a CPU (Central Processing Unit, not shown).

In the write mode of RAM 13 (see FIG. 8), symbols U0 to U6 and the write signal are supplied to input terminal 20. First selector 21 selects a downcounter corresponding to the symbol under operation from downcounter group 18 in response to the write signal. Counts CN7-i of selected scale-of-(7-i) downcounter are supplied to RAM 13 (see FIG. 8) successively as lower addresses H therefor through an adder 22, a modulo operation circuit 23 and a first output terminal 24 in order. (The letter i means any integer of 1 to 6.) At the time, however, modulo operation circuit 23 is deactivated by a controller 25 coupled between input terminal 20 and itself so as to pass therethrough counts CN7-i of selected scale-of-7(7-i) downcounter as they are. Controller 25 deactivates modulo operation circuit 23 in response to the write signal supplied from input terminal 20. At the time, moreover, a second input of an AND gate 26 whose first input and output are coupled respectively to second selector 30 and adder 22 is held at a low (L) level. Then AND gate 26 fails to transmit the output of ROM 19 to adder 22 so that adder 22 transmits counts CN7-i of selected scale-of-(7-i) downcounter as they are to RAM 13 (see FIG. 8). Accordingly, counts CN7-i are supplied to RAM 13 as lower addresses H. A decoder 28 coupled to input terminal 20 generates upper addresses V in response to the write signal and supplies upper addresses V into RAM 13 through second output terminal 29.

In the read mode of RAM 13 (see FIG. 8), symbols U0 to U6 and the read signal are supplied to input terminal 20. First selecter 21 selects a downcounter, e.g., scale-of-(7-i) downcounter, from downcounter group 18 in response to the read signal so that counts CN7-i of selected scale-of-(7-i) downcounter are supplied to adder 22. At the same time, second selector 30 provides a delay mount data (6-i)D selected from ROM 19 in response to the read signal to the first input of AND gate 26. The second input of AND gate 26 is held at a high (H) level in the read mode of RAM 13 so as to transmit selected delay data 6-i therethrough. Then adder 22 adds selected delay data 6-i on counts CN7-i of selected scale-of-(7-i) downcounter and then supplies the sum obtained by the addition to modulo operation circuit 23. Modulo operation circuit 23 makes its modulo-5 operation on the sum and then provides its modulo-5 sum output as lower addresses H to RAM 13 through first output terminal 24, while decoder 28 generates upper addresses V in response to the read signal and supplies generated upper addresses V into RAM 13 through second output terminal 29.

However, a conventional deinterleaving apparatus comprised of the previously conceived circuit arrangement as shown in FIG. 11 for generating the write addresses and the read addresses for the RAM are required to have many downcounters in response to the number of symbols. Therefore the structure of the conventional deinterleaving apparatus has been very complicated. And moreover, the conventional deinterleaving apparatus has been expensive because there have been left in the RAM several memory areas unused.

SUMMARY OF THE INVENTION

Accordingly, an object of the present invention is to provide a control system for deinterleaving memories in a digital reproducing apparatus which has a simple structure for generating write addresses and read addresses for a RAM for storing symbols.

Another object of the present invention is to provide a control system for deinterleaving memories in a digital reproducing apparatus which is able to use most of memory areas of a RAM for storing symbols effectively, or to use a RAM for storing symbols by a small quantity of memory areas.

These and other objects are achieved in a control system for deinterleaving memories in digital reproducing apparatus according to the present invention, in which a plurality of cross-interleaved symbols are written into or read out from memory areas of a RAM. The control system essentially includes a first process for preparing the RAM consisting of at least a memory area with a predetermined storage capacity, a second process for making a first processing as to a first symbol in the plurality of cross-interleaved symbols to the memory area, and a third process for making a second processing as to a second symbol in the plurality of cross-interleaved symbols to the memory area.

Additional objects, advantages and features of the present invention will further become apparent to persons skilled in the art from a study of following description and of the accompanying drawings, in which:

BRIEF DESCRIPTION OF THE DRAWINGS

FIG. 2 is a diagram showing the memory area as to upper address C, which is exemplified from FIG. 1 for illustrating relations between addresses for processing symbols and delay amounts therefor.

FIG. 3 is a diagram for illustrating transitions of the addresses in FIG. 2.

FIGS. 5(a) to 5(c) are diagrams for illustrating an allocation of memory areas of a RAM for symbols and modifications therefrom according to the principle of the present invention.

FIG. 6 is a diagram for illustrating transitions of read addresses and write addresses for a combination of symbols exemplified from the diagram of FIG. 5(a).

FIG. 9 is a diagram showing a memory area of a RAM in the conventional deinterleaving apparatus.

FIG. 10 shows a diagram for illustrating transitions of the read addresses and the write addresses in FIG. 9.

DESCRIPTION OF THE PREFERRED EMBODIMENTS

Figure 1:
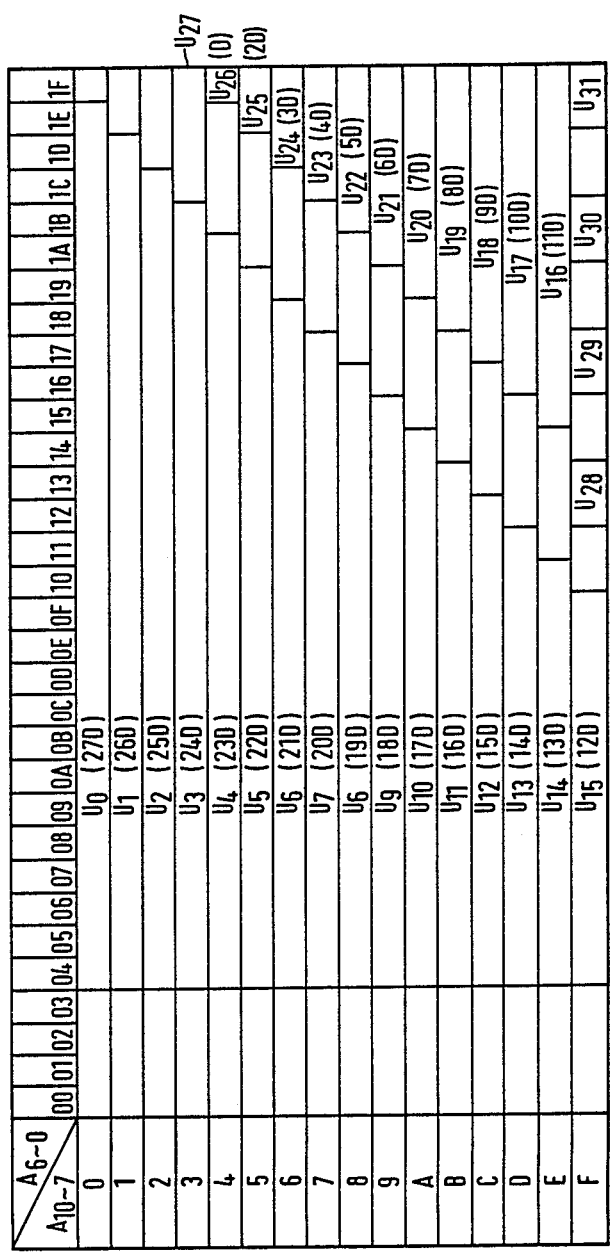
FIG. 1 is a diagram for illustrating an allocation of memory areas of a RAM for storing symbols according to an embodiment of the present invention.

The present invention will now be described in detail with reference to the accompanying drawings, namely, FIGS. 1 to 6 and 8. Throughout the drawings, like reference numerals and letters are used to designate like or equivalent elements for the sake of simplicity of explanation.

Before describing embodiments of the control system for deinterleaving memories in digital reproducing apparatus according to the present invention, it is necessary to describe briefly the principle of the present invention. This will be down by referring to FIG. 5, FIG. 6 and FIG. 8.

Figure 11:
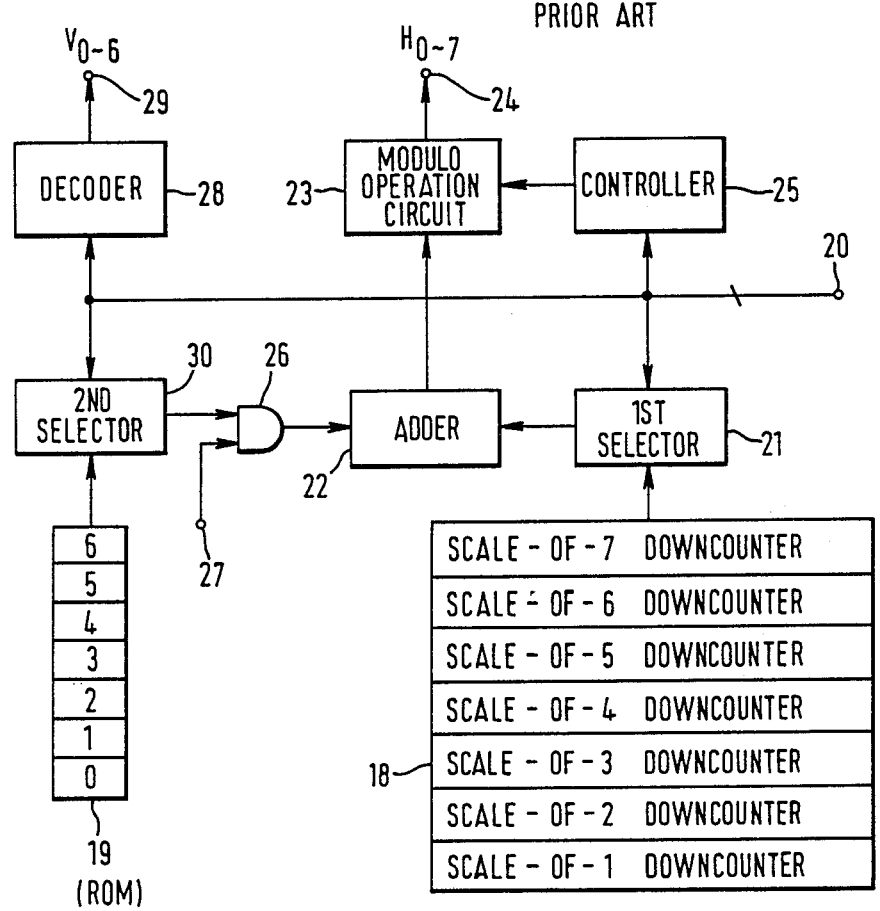
FIG. 11 is a block diagram for generating the write addresses and the read addresses in FIG. 10.

There will now be described a simplified example of a RAM for processing symbols in reference to FIG. 5, where seven symbols U0–U6 are adopted, as in the prior conceived example described previously in referring to FIGS. 9 to 11. Respective delay amounts of symbols U0 to U6 are also assumed as 6F, 5F, ... and 0F. RAM 13 has its memory areas allocated as shown in FIG. 5(a). One of the memory areas is arranged to store a symbol with the longest delay amount, While other memory areas are respectively arranged to store a combination of two of the other symbols whose delay amounts are different from each other. That is, there are provided in the embodiment four memory areas as to upper addresses 0 to 3. The memory area as to upper address 0 is arranged to store symbol U0, while other three memory areas as to upper addresses 1 to 3 are arranged to store a combination of two symbols, respectively U1 and U6, U2 and U5, and U3 and U4. That is, the second longer symbol U1 is combined with the shortest symbol U6. The third longer symbol U2 is combined with the second shorter symbol U5. And the fourth longer symbol U3 is combined with the third shorter symbol U4. Write and read operations of any one combination of the symbols, e.g., U2 and U5 are repeatedly made as shown in FIG. 6, wherein r2 and w2 represent respectively the read address and the write address of symbol U2, while r5 and w5 represent respectively the read address and the write address of symbol U5. Further the combination of symbols U2 and U5 is allocated a memory area of seven units length as to the lower address H including a blank area designated to lower address 7 so that a scale-of-8 downcounter (not shown) is used for generation of lower addresses 0 to 7. In FIG. 6, CN8 means the count values of the scale-of-8 downcounter. Count values "0" to "7" of the scale-of-8 downcounter are used as write addresses w2 for symbol U2 as they are, while values given by adding a data 4 as the delay amount for symbol U2 at modulo-8 addition to write addresses w2, (i.e., the count values of the scale-of-8 downcounter) are used as read addresses r2 therefor. On the other hand, write addresses w5 for symbol U5 are given by adding a data 1 at modulo-8 addition to write addresses w2 for separating themselves from write addresses w2, while read addresses r5 are given by adding a data 1 as the delay amount for symbol U5 at modulo-8 addition to write addresses w5.

That is, the operations for generating the above addresses w2, r2, w5 and r5 are given by following equations:

$$w2 = CN8$$

$$r2 = CN8 + 4$$

$$w5 = CN8 + 4 + 1 = CN8 + 5$$

$$r5 = CN8 + 5 + 1 = CN8 + 6$$

where + means the modulo-8 addition. In the results of the modulo-8 operations in the above equations, however, the bit contents of addresses r2, w5 and r5 the same as the corresponding original bit contents before modulo-8 operations except for the carry data thereof, as shown in following table.

|   | 8 4 2 1 | modolo-8 | modolo-6 |
|---|---------|----------|----------|
| 0 | 0 0 0 0 | 0 0 0    | 0 0 0    |
| 1 | 0 0 0 1 | 0 0 1    | 0 0 1    |
| 7 | 0 1 1 1 | 1 1 1    | 0 0 1    |
| 8 | 1 0 0 0 | 0 0 0    | 0 1 0    |
| 9 | 1 0 0 1 | 0 0 1    | 0 1 1    |
| F | 1 1 1 1 | 1 1 1    | 0 1 1    |
| G | 0 0 0 0 | 0 0 0    | 1 0 0    |
| H | 1 0 0 1 | 0 0 1    | 1 0 1    |

In the table, modulo-6 operations are also included as an example of other modulo operations for a comparison with the modulo-8 operations. As seen from the table, the bit contents resulting from modulo-6 operations are different from the corresponding original bit contents before modulo-6 operations. Therefore, the modulo-6 operations and the like other than the modulo-8 operation require some complicated calculations to convert the bit contents, while the modulo-8 operations are easily made by only dropping the carry data. In other words, the respective sums in the above equations are used as the write addresses and the read addresses for r2, w5 and r5 in the present invention as they are, without performing any modulo operations.

Figures 5A, 5B, 5C, 6:
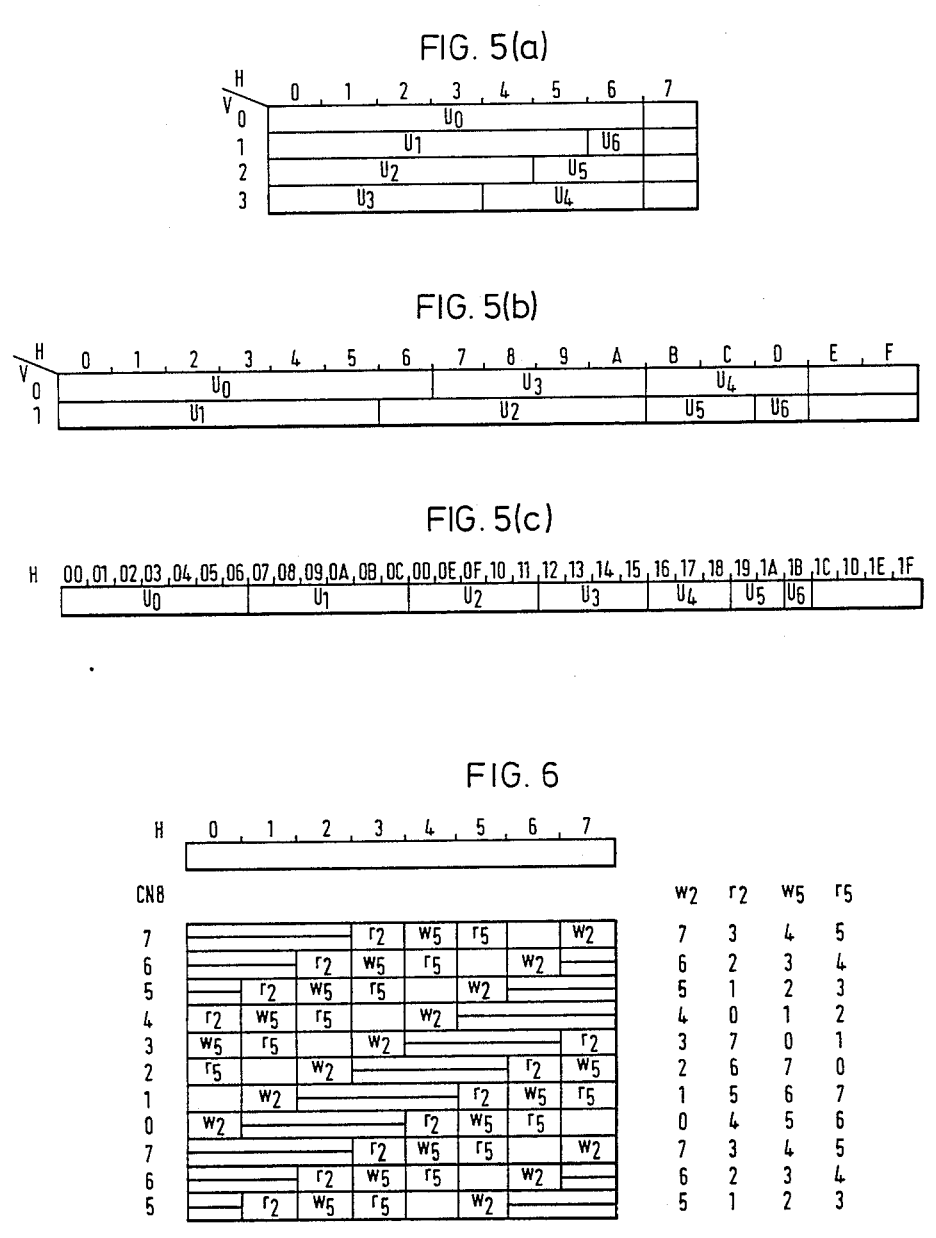

According to respective addresses w2, r2, w5 and r5 generated as above, symbols U2 and U5 are written into or read from RAM 13 (see FIG. 8) without overlapping the memory areas while other and with keeping the necessary delay amounts themselves, as shown in FIG. 6. Concerning other symbols; U1, U3, U4 and U6, write and read addresses therefor are generated in a like manner as described above, by only adding individual necessary delay amount data to the counts of the scale-of-8 downcounter.

Figure 7:
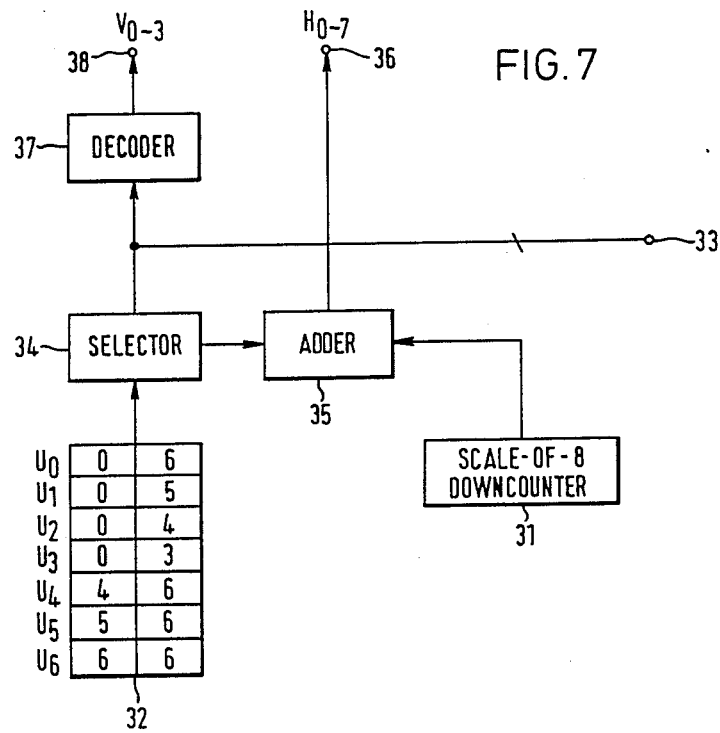
FIG. 7 is a block diagram for generating the write addresses and the read addresses in FIG. 6.
Figure 8:
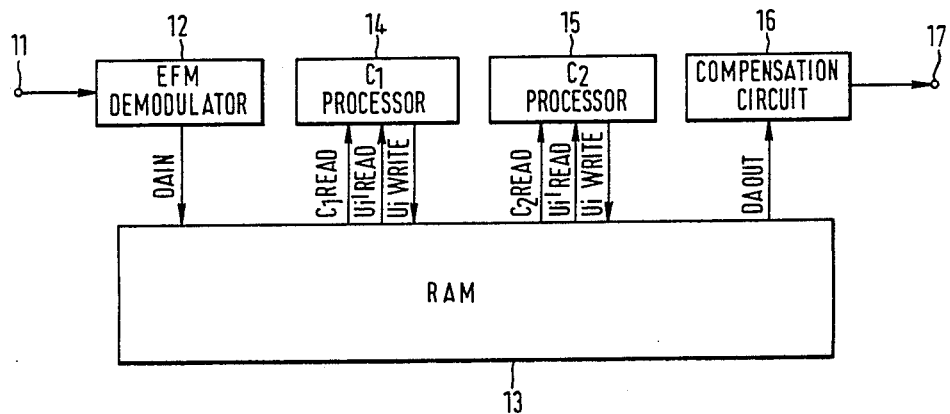
FIG. 8 shows a block diagram of an example of the reproducing section of the digital audio system in which the deinterleaving apparatus of the present invention and the like are included.

Therefore, a circuit arrangement as shown in FIG. 7 has been designed for generating write addresses w and read addresses r for all symbols U0 to U6 as to the example shown in FIG. 6. In FIG. 7, there are provided a scale-of-8 downcounter 31 and a ROM (Read Only Memory) 19. ROM 19 is coupled to an adder 22 through only a selector 30 which are connected to an input terminal 20, while scale-of-8 downcounter 31 is coupled to adder 22 directly. Scale-of-8 downcounter 31 generates lower addresses H for writing respective symbols U0 to U6 into RAM 13 (see FIG. 8), while ROM 19 stores two groups of fixed data respectively corresponding to symbols U0 to U6; a first group to be added on the counts of scale-of-8 downcounter 31 at the write mode of symbols U0 to U6, and a second group to be added on the counts of scale-of-8 downcounter 31 at the read mode of symbols U0 to U6. Input terminal 20 receives data respectively indicating symbols U0 to U6, the read signal and the write signal from EFM demodulator 12, C1 processor 14 and C2 processor 15 (see FIG. 8) and then provides the data to selector 30 and a decoder 28 which is connected to a second output terminal 29.

In the write mode of RAM 13 (see FIG. 8), the write signal is supplied to input terminal 20 from a CPU (central processing unit, not shown) together with symbols U0 to U6 from EFM demodulator 12, C1 processor 14 or C2 processor 15. Second selector 30 reads suitable delay amount data out from the first group of ROM 19 and then provides to adder 22. On the other hand, the counts CN8 of scale-of-8 downcounter 31 is supplied to adder 22. Adder 22 adds the selected delay data from the first group of ROM 19 to the counts CN8 of scale-of-8 downcounter and then supplies the sum resulted by the addition as lower addresses H to first output terminal 24 directly without making any modulo operations. The sums, i.e., lower addresses H on first output terminal 24 are then applied to RAM 13. At the same time, decoder 28 generates upper addresses V corresponding to the supplied symbols U0 to U6 in response to the write signal.

In the read mode of RAM 13 (see FIG. 8), lower addresses H and upper addresses V are generated in the same manner as described above. However, selector 30 reads the suitable delay amount data to be added to the counts CN8 out from the second group of ROM 19.

As is easily understood from the above consideration on the principle of the present invention, counter means for generating addresses is accomplished by only one scale-of-8 downcounter. Any further modulo operations are not all required. The circuit arrangement for generating lower addresses H and upper addresses V is very simple and the RAM for storing symbols in the course of deinterleave operations uses its memory areas effectively without leaving areas unused.

The allocation of the memory areas of the RAM for the respective symbols U0 to U6 is able to be modified in various ways, e.g., as shown in FIG. 5(b) or 5(c) instead of FIG. 5(a). In the modification of FIG. 5(b), there are provided two memory areas as to upper addresses V. One memory area with upper adddress 0 stores U0, U3 and U4, while the other memory area with upper address 1 stores U1, U2, U5 and U6. In the modification of FIG. 5(c), there is provided only one memory area as to upper address V. The memory stores all symbols U0 to U6 in the same area as to an upper address.

A practical embodiment of the present invention which has been made on the basis of above principle will now be described in detail in reference to FIGS. 1 to 4 and 8. Referring now to FIG. 1 which illustrates an allocation of memory areas of a RAM for storing symbols U0 to U31, some memory areas as to upper address (hereinafter referred as row) V are prepared to store a pair of symbols. While some other rows are prepared to store only one symbol, and one of the rows is prepared to store plural symbols more than two. That is, combinations of every two symbols; U3 and U27, U4 and U26, U5 and U25, . . . and, U14 and U16 are stored in rows 4 to E pair by pair. While symbols U0, U1 and U2 are respectively stored in rows 0, 1 and 2 one by one. And a combination of symbol U15 and parity symbols U28 to U31 are stored in row F. In FIG. 1, $A_{6-0}$ and $A_{10-7}$ respectively designate the lower addresses and the upper addresses of RAM 13 (see FIG. 8). Further numerals with letter D in parentheses after respective symbols U0 to U26 indicate respectively delay amount data given thereto. Also the rest of the memory areas for symbols are left for absorbing jitter components of the symbols.

Referring now to FIG. 2, there is shown a diagram showing the memory area as to upper address C or row C, which is exemplified in FIG. 1 for illustrating relations between addresses for processing symbols and delay amounts therefor. In FIG. 2, the exemplified row C which stores the combination of symbols U12 and U18 are indicated with length by frame unit F. There will be described in detail, hereinafter, an operation for generating the write and the read addresses for the combination of symbols U2 and U5 in accordance with FIG. 2. A first counter (described later) is provided and its count value A is placed in the illustrated position prior to symbol U12 as the address for C1 processing (i.e., the first error correction described before) on symbol U12 at C1 processor 14 (see FIG. 8). A second counter (described later) is provided and its count value B is placed in the illustrated position prior to the position of count A as the address for inputting symbol U12 to RAM 13 (see FIG. 8). The second counter counts under a control of phase components extracted from an RF signal reproduced from a CD so that count value B is attended by jitters according to irregularities of a disc rotating system. Therefore, a buffer area with a length of 12F is prepared for absorbing the jitter as shown in FIG. 2 so that count B is allowed to fluctuate in the buffer area without overlapping the other area in row C. On the other hand, the first counter counts under the control of a reference clock signal generated from a conventional stable quartz oscillator so that the position of count A is kept accurately without fluctuating.

An address for C2 processing (i.e., the second error correction described before) on symbol U12 at C2 processor 15 (see FIG. 8) is generated by adding 60, i.e., four times of delay amounts 15D of symbol U12, on count A of the first counter. An address for outputting symbol U12 from RAM 13 is also generated by adding 61 on count A of the first counter. Therefore, the addresses as to symbol U12 can be summarized as follows;

$DAIN(U12) = B$ $C1(U12) = A$ $C2(U12) = A + 60$ $DAOUT(U12) = A + 61$

Addresses as to symbol U18, are generated in a like manner as described above so that they are also able to be summarized as follows;

$DAIN(U18) = B + 76$ $C1(U18) = A + 76$ $$C2(U12) = A + 112$$

$$DAOUT(U12) = A + 115$$

where the numerals 60, 61, 76, 112 and 115 corresponding to the fixed data stored in ROM 19 of FIG. 7. By the way, address DAIN(U18) for inputting symbol U18 into RAM 13 is generated based on count B of the second counter. Therefore, another buffer area with a length of 12F is prepared for absorbing the jitter at the operation of inputting symbol U18 into RAM 13 as shown in FIG. 2.

Whenever a series of operations for generating the addresses from DAIN(U12) to DAOUT(U18) finishes, the addresses shift rightwards by every one unit of frame F as three transition states in FIG. 3. The addresses shift to the left side position of the row at the next operation after they have reached the right side position. And then they shift rightwards by one frame F at the next operation step.

Figure 4:
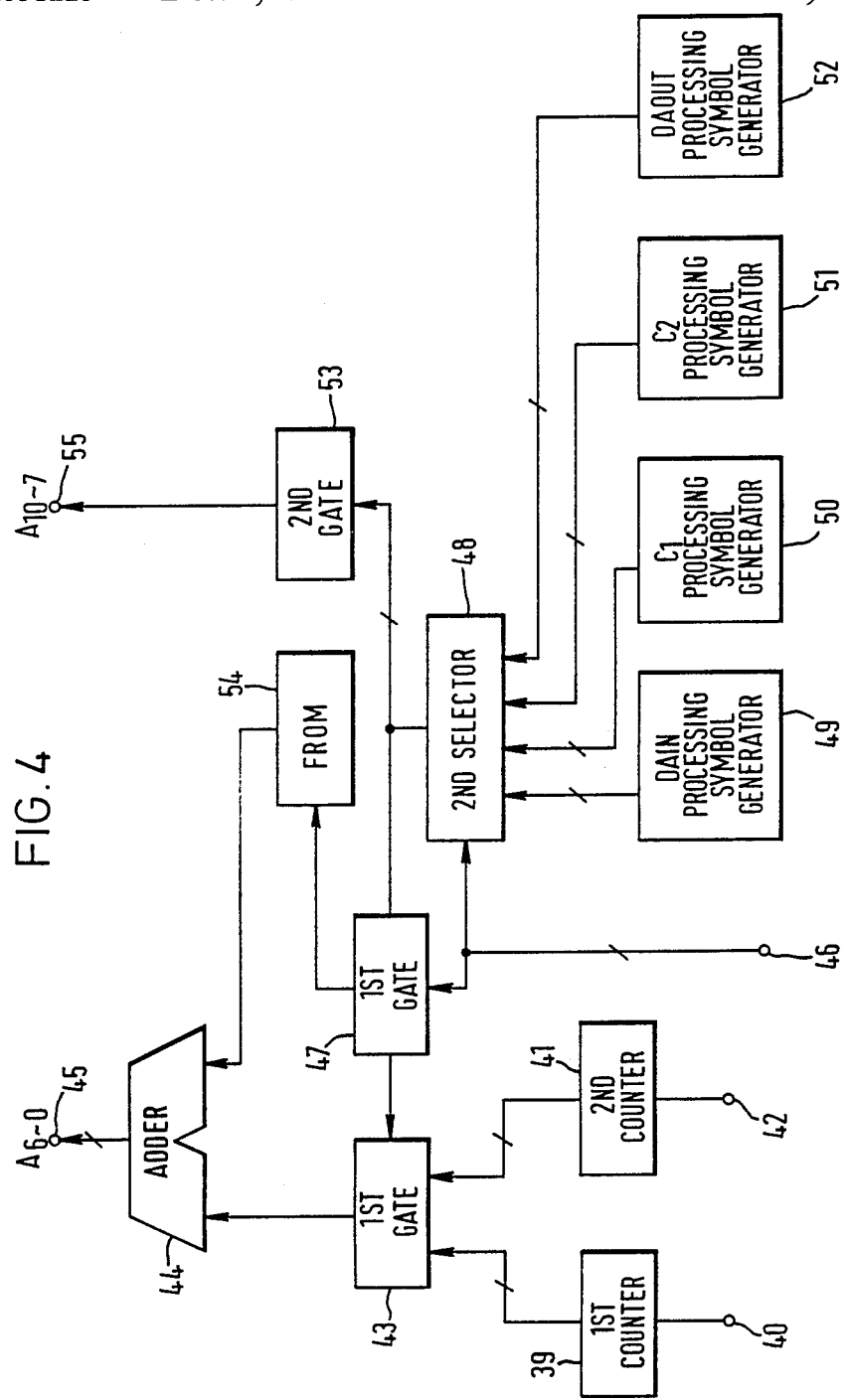
FIG. 4 is a circuit diagram for generating write addresses and read addresses of symbols for a RAM according to the present invention.

Referring now to FIG. 4, a circuit diagram for generating the addresses for processing the above respective operations is shown; DAIN(U12) operation through DAOUT(U18) operation as to row C according to one embodiment of the the present invention will be explained in detail hereinafter. In FIG. 4, there are provided a first and a second counter 39, 41 which are comprised of seven bit binary counters. First counter 39 receives through a first input terminal 40 a reference clock signal generated by a conventional quartz oscillator (not shown) such as described in reference to C1(U12) processing in FIG. 2, and then counts its count A down under the control of the reference clock signal. The quartz oscillator supplies every pulse of the reference clock signal to first input terminal 40 whenever a series of operations for symbols, e.g., a series of operations; DAIN(U12) operation through DAOUT(U18) operation in a same row, e.g., a memory area as to one of upper addresses $A_{10-7}$; row C (see FIG. 2) has been finished. Count A of first counter 39 is counted down one by one to shift its address position leftwards in row C in response to every pulse of the reference clock signal. Second counter 41 receives through a second input terminal 42 phase components extracted from an RF signal reproduced from a CD such as described in reference to DAIN(U12) processing in FIG. 2, and then counts its count B down under the control of the reference clock signal.

Counts A and B of first and second counters 39, 41 are applied to a first input of an adder 44 through a first selector 43. First selector 43 has three inputs whose first and second inputs are respectively coupled to first and second counters 39, 41 and one output which is coupled to the first input of adder 44. Adder 44 has another input, i.e., a second input coupled to a ROM 54 and an output coupled to RAM 13 (see FIG. 8) through a first output terminal 45. Adder 44 supplies its output as the lower addresses $A_{6-0}$ for RAM 13.

Other timing signals for operating the above DAIN, C1, C2 and DAOUT processings are supplied to a third input terminal 46 from a CPU (not shown). The timing signals on third input terminal 46 are supplied to a first input of a gate 47 and an input of a second selector 48. First gate 47 has another input, i.e., a second input and two outputs, i.e., first and second ouputs. Second selector 48 has four other inputs respectively connected to a DAIN processing symbol generator 49, a C1 processing symbol generator 50, a C2 processing symbol generator 51 and a DAOUT processing symbol generator 52.

DAIN processing symbol generator 49 and C1 processing symbol generator 50 generate thirty two symbols consisting of twenty four data word symbols U0 to U23, four P-parity word symbols U24 to U27 and four Q-parity word symbols U28 to U31. While C2 processing symbol generator 51 and DAOUT processing symbol generator 52 generate twenty eight symbols U0 to U27 other than Q-parity word symbols U28 to U31.

Second selector 48 selects one of the symbols supplied from symbol generators 49 to 52 in response to a timing signal supplied from third input terminal 46 and transmits a binary code data corresponding to the selected symbol to the second input of first gate 47 and an input of a second gate 53. First gate 47 controls first selector 43 in response to the timing signal supplied from third input terminal 46 and the binary code data corresponding to the selected symbol from second selector 48 so that first selector 43 introduces count B of second counter 41 to adder 44 only at a time of DAIN processing. At the same time, first gate 47 controls ROM 54 to produce one of fixed data which are stored in ROM 54 corresponding to respective rows 1 to F as to upper addresses $A_{10-7}$. Therefore, adder 44 adds count B and the selected fixed data, and supplies the resultant sum to RAM 13 as the lower addresses. Further second gate 53 generate upper addresses according to the binary code data produced from second selector 48 and supplies the addresses to RAM 13 through second output terminal 55. By the way, the memory area as to the upper address F, i.e., row F is provided for storing four symbol U28 to U31 other than one word sumbol U15 as shown in FIG. 1. It is able to store any number resulting from raising 2 to nth power, i.e., $2^n$, where n is a positive integer.

In the above embodiment, there has been explained the present invention about an optical CD reproducing apparatus. However, it will be easily understood that the present invention is able to be applied for other apparatus for reproducing digital data with cross-interleaving processing. That is, the present invention is not restricted to the embodiments described above and shown, and that various modifications and changes may be made without departing from the spirit and scope of the present invention.

What is claimed is:

1. A control system for deinterleaving memories in digital audio reproducing apparatus in which a plurality of cross-interleaved symbols are written into and read out from a RAM (Random Access Memory), said control system comprising:

a first processor for preparing at least one memory area with a predetermined storage capacity in said RAM, a second processor for processing a first symbol in said plurality of cross-interleaved symbols to said memory area including a first counter which counts a first address for said processing of said first signal and a third processor for processing a second symbol in said plurality of cross-interleaved symbols to said memory area including an adder which produces a sum of said count of said counter and a predetermined fix data as a second address for processing said second symbol.

2. A control system for deinterleaving memories in digital audio reproducing apparatus according to claim 1, wherein said first counter is controlled by phase components extracted from an RF signal reproduced from a recording medium.

3. A control system for deinterleaving memories in digital audio reproducing apparatus according to claim 2, wherein said processing of said first and second symbols are respectively write processings for writing said first and second symbols into said memory area.

4. A control system for deinterleaving memories in digital audio reproducing apparatus according to claim 3, wherein said fix data has a value which is able to separate said second symbol from said first symbol in said memory area for preventing an overlapping thereof.

5. A control system for deinterleaving memories in digital audio reproducing apparatus according to claim 4, wherein said memory area is further allocated first and second buffer storage spaces respectively prior to spaces allocated for said first and second symbols.

6. A control system for deinterleaving memories in digital audio reproducing apparatus according to claim 5, wherein said first and second addresses are respectively assigned in said first and second buffer storage spaces.

7. A control system for deinterleaving memories in digital audio reproducing apparatus in which a plurality of cross-interleaved symbols are written into and read out from a RAM, said control system comprising:
 a first processor for preparing at least one memory area with a predetermined storage capacity in said RAM,
 a second processor for write processing a first symbol in said plurality of cross-interleaved symbols to said memory area by using a first counter which counts a first address for write processing said first symbol under a control of phase components extracted from an RF signal reproduced from a recording medium,
 a third processor for write processing a second symbol in said plurality of cross-interleaved symbols to said memory area by using an adder which produces a sum of the count of said first counter and a first predetermined fix data as a second address for write processing said second symbol,
 a fourth processor for making an error correction to said first symbol stored in said memory area according to said write processing of said first symbol by using a second counter which is controlled by a stable reference clock signal generated from a quartz oscillator as a third address for making said error correction on said first symbol, and
 a fifth processor for making said error correction to said second symbol stored in said memory area according to said write processing of said second symbol by using said adder which produces a sum of the count of said second counter and a second predetermined fix data as a fourth address for making said error correction processing on said second symbol.

8. A control system for deinterleaving memories in digital audio reproducing apparatus according to claim 7, wherein said first fix data has a value which is able to separate said second symbol from said first symbol in said memory area for preventing an overlapping thereof.

9. A control system for deinterleaving memories in digital audio reproducing apparatus according to claim 8, wherein said memory area is further allocated first and second buffer storage spaces respectively prior to spaces allocated for said first and second symbols.

10. A control system for deinterleaving memories in digital audio reproducing apparatus according to claim 9, wherein said first and third addresses are assigned in said first buffer storage space while said second and fourth addresses are assigned in said second buffer storage space.

11. A control system for deinterleaving memories in digital audio reproducing apparatus according to claim 7, further comprising:
 a sixth processor for read processing said first symbol stored in said memory area according to said write processing by using said adder which produces a sum of the count of said second counter and a third predetermined fix data as a fifth address for read processing said first symbol, and
 a seventh processor for read processing said second symbol stored in said memory area according to said write processing by using said adder which produces a sum of the count of said second counter and a fourth predetermined fix data as a sixth address for read processing said second symbol.

12. A control system for deinterleaving memories in digital audio reproducing apparatus according to claim 11, wherein said memory area is further allocated first and second buffer storage spaces respectively prior to spaces allocated for said first and second symbols.

13. A control system for deinterleaving memories in digital audio reproducing apparatus according to claim 12, wherein said first, third and fifth addresses are assigned in said first buffer storage space while said second, fourth and sixth addresses are assigned in said second buffer storage space.

* * * * *